US010284037B2

(12) United States Patent
Miyajima

(10) Patent No.: US 10,284,037 B2
(45) Date of Patent: May 7, 2019

(54) BRUSHLESS MOTOR WITH PERMANENT MAGNET ROTOR WITH MAGNETIC POLES WITH FLUX BLOCKING PARTS/THROUGH HOLES TOWARDS THE SHAFT FORMING ANGLES

(71) Applicant: MABUCHI MOTOR CO., LTD., Matsudo, Chiba (JP)

(72) Inventor: Yusuke Miyajima, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 379 days.

(21) Appl. No.: 14/698,417

(22) Filed: Apr. 28, 2015

(65) Prior Publication Data

US 2015/0318746 A1    Nov. 5, 2015

(30) Foreign Application Priority Data

Apr. 30, 2014 (JP) .................................. 2014-094085

(51) Int. Cl.
*H02K 1/27* (2006.01)
*H02K 3/28* (2006.01)

(52) U.S. Cl.
CPC ............. *H02K 1/2773* (2013.01); *H02K 3/28* (2013.01); *H02K 1/2706* (2013.01);
(Continued)

(58) Field of Classification Search
CPC .... H02K 1/2773; H02K 1/2766; H02K 1/276; H02K 1/2753; H02K 1/272; H02K 1/27;
(Continued)

(56) References Cited

U.S. PATENT DOCUMENTS 5,066,880 A * 11/1991 Banon ..................... H02K 21/14
310/156.55
8,487,496 B2 * 7/2013 Ifrim ..................... H02K 1/2773
310/156.19
(Continued)

FOREIGN PATENT DOCUMENTS

CN    102308455 A    1/2012
CN    102449881 A    5/2012
(Continued)

OTHER PUBLICATIONS

DE 102012219003 English Translation.*
(Continued)

*Primary Examiner* — Bernard Rojas
*Assistant Examiner* — Maged M Almawri
(74) *Attorney, Agent, or Firm* — Schwabe Williamson & Wyatt, PC

(57) ABSTRACT

A rotor core includes: an annular part around a through hole; a plurality of fan-shaped magnetic pole pieces radially formed around the annular part; and a plurality of magnet holders radially formed between adjacent magnetic pole pieces, and a plurality of first magnetic flux blocking parts formed in respective areas between adjacent magnet holders. The magnet holder includes a second magnetic flux blocking part at an end of the magnetic holder toward the rotating shaft. The rotor core includes two magnetic paths formed between the first magnetic flux blocking part and the two second magnetic flux blocking parts adjacent to the first magnetic flux blocking part. The two magnetic paths branch in different directions toward the annular part from the end of the magnetic pole piece toward the rotating shaft.

7 Claims, 12 Drawing Sheets

(52) U.S. Cl.
CPC ......... *H02K 1/2753* (2013.01); *H02K 1/2766* (2013.01); *H02K 2213/00* (2013.01); *H02K 2213/03* (2013.01)

(58) Field of Classification Search
CPC ............. H02K 1/2706; H02K 2213/00; H02K 2213/03; H02K 1/242
USPC ........ 310/156.53–156.57, 216.007, 216.091, 310/216.106, 216.108, 269, 156.43, 310/156.01–156.57, 216.107, 216.103
See application file for complete search history.

(56) References Cited

U.S. PATENT DOCUMENTS

| | | | | |
|---|---|---|---|---|
| 2006/0131976 A1* | 6/2006 | Kikuchi | ................. | H02K 1/276 310/156.46 |
| 2007/0252469 A1* | 11/2007 | Nishiura | .............. | H02K 1/2773 310/156.56 |
| 2009/0230803 A1* | 9/2009 | Nakayama | ........... | H02K 1/2766 310/156.56 |
| 2010/0277028 A1* | 11/2010 | Alexander | ........... | H02K 1/2773 310/156.51 |
| 2012/0112591 A1* | 5/2012 | Feuerrohr | ............ | H02K 1/2773 310/156.15 |
| 2012/0175989 A1* | 7/2012 | Mathoy | ................ | H02K 1/2766 310/156.53 |
| 2013/0038161 A1* | 2/2013 | Pan | ....................... | H02K 1/2773 310/156.01 |
| 2013/0038165 A1* | 2/2013 | Pan | ....................... | H02K 21/16 310/156.48 |
| 2013/0057103 A1* | 3/2013 | Han | ..................... | H02K 1/2773 310/156.12 |
| 2013/0061640 A1* | 3/2013 | Kim | ....................... | H02K 1/148 68/140 |
| 2013/0187486 A1* | 7/2013 | Lee | .......................... | H02K 5/02 310/43 |
| 2013/0187506 A1* | 7/2013 | Lee | ........................ | H02K 1/278 310/156.12 |
| 2014/0103769 A1* | 4/2014 | Kingrey | ................. | H02K 21/16 310/156.12 |

FOREIGN PATENT DOCUMENTS

| | | | |
|---|---|---|---|
| DE | 102012219003 | * | 10/2012 |
| JP | 2000-197292 A | | 7/2000 |
| JP | 2006-311772 A | | 11/2006 |
| JP | 2009-153299 A | | 7/2009 |
| JP | 2012-517209 A | | 7/2012 |
| JP | 2014-023393 A | | 2/2014 |

OTHER PUBLICATIONS

Office Action issued in Japanese Application No. 2014-094085 dated Jul. 25, 2017; 6 pages including English translation.
Office Action for Chinese Patent Application No. 2015102143165 dated Jan. 30, 2018; 17 pages including English translation.
Office Action issued in Chinese Application No. 201510214316.5, dated May 14, 2018; 16 pages including English translation.
Notification of Reasons for Refusal for Japanese Application No. 2014-094085, dated Feb. 27, 2018; 9 pages including English translation.
Office Action issued in Chinese Patent Application No. 201510214316.5 dated Sep. 20, 2018; 14 pages including English translation.

* cited by examiner

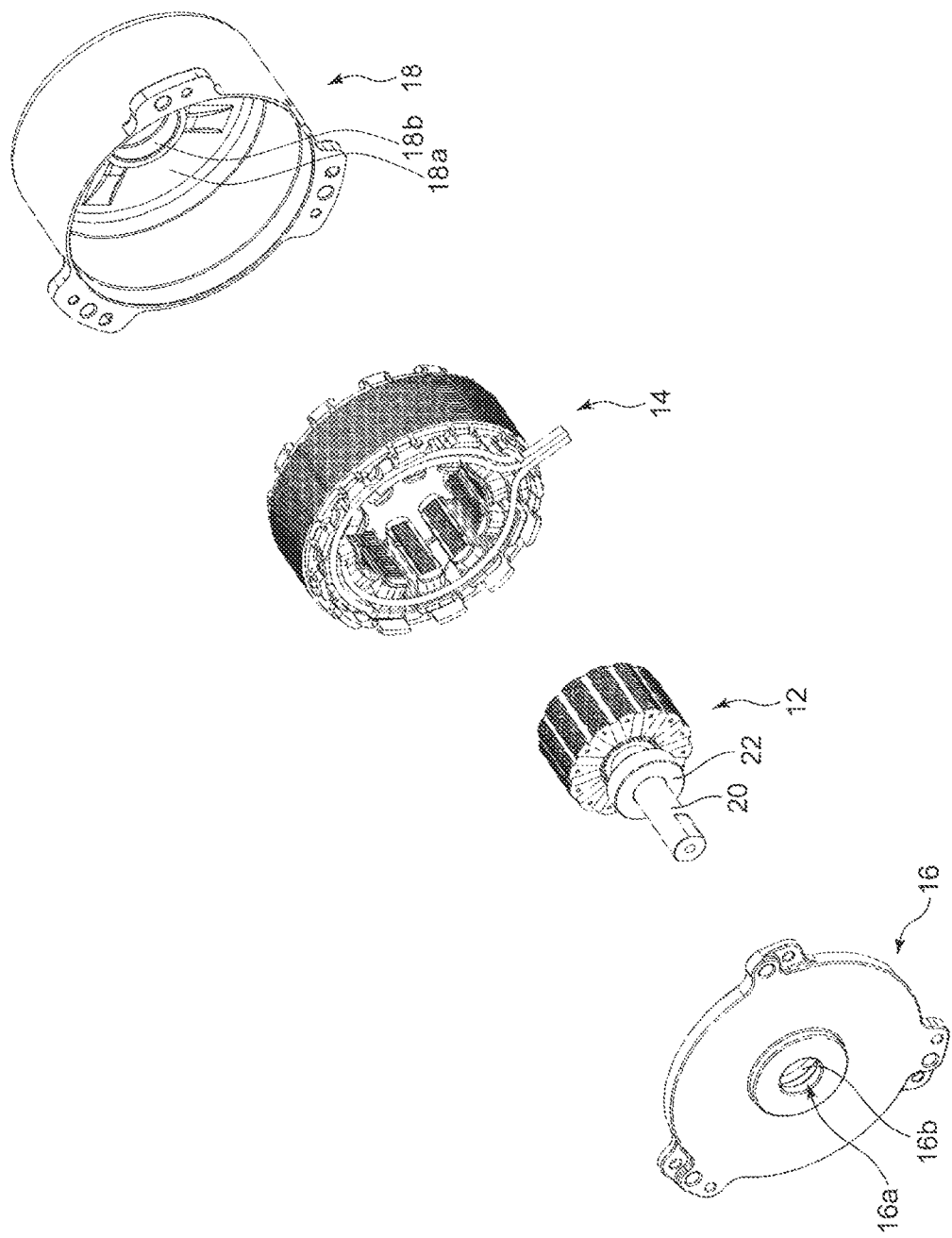
F.I.G.3

BRUSHLESS MOTOR WITH PERMANENT MAGNET ROTOR WITH MAGNETIC POLES WITH FLUX BLOCKING PARTS/THROUGH HOLES TOWARDS THE SHAFT FORMING ANGLES

CROSS-REFERENCE TO RELATED APPLICATIONS

This application is based upon and claims the benefit of priority from the prior Japanese Patent Application No. 2014-094085, filed on Apr. 30, 2014, the entire content of which is incorporated herein by reference.

BACKGROUND OF THE INVENTION

1. Field of the Invention

The present invention relates to a rotor of a brushless motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

Known as a type of such a brushless motor is an interior permanent magnet (IPM) motor where a permanent magnet is embedded in a rotor. For example, electric appliances are known in which a plurality of plate-like magnets are radially embedded in a rotor yoke and the magnets are disposed such that the same poles of adjacent magnets face each other in a circumferential direction of the yoke (see, for example, FIG. 2 of patent document 1).

[patent document 1] Japanese Translation of PCT International Application Publication No. JP2012-517209

One of the methods to improve a rotational torque of a brushless interior permanent magnet motor is to use a magnet with high residual magnet flux density. If the short circuit flux occurs inside a rotor, the average magnetic flux density is lowered at the outer circumference of the rotor yoke. This is addressed in the aforementioned electric appliances by forming near the magnet a through hole called a flux barrier with high magnetic resistance for preventing the short circuit flux at the ends of the magnet.

The fan-shaped rotor magnetic pole pieces in the aforementioned electric appliance are connected to the annular part around the central axis and are merely supported by a narrow area located between adjacent flux barriers. For this reason, the rotor magnetic pole pieces are displaced (vibrated) relative to the normal position due to various forces (centrifugal force and magnetic force) exerted on the rotor magnetic pieces as the rotor is rotated so that troubles such as rotational noise or rotor damages might occur.

SUMMARY OF THE INVENTION

The present invention addresses the issue and a purpose thereof is to provide a technology capable of realizing a high-rigidity and low-noise brushless motor.

A rotor according to an embodiment of the present invention includes: a rotor core; and a plurality of magnets. The rotor core includes: an annular part around a hole in which a rotating shaft is inserted; a plurality of magnetic pole pieces radially formed around the annular part; and a plurality of magnet holders radially formed between adjacent magnetic pole pieces. A plurality of first magnetic flux blocking parts is formed outside the annular part and in respective areas between adjacent magnet holders. The magnet holder includes a second magnetic flux blocking part at an end of the magnetic holder toward the rotating shaft. The magnets are housed in the magnet holders such that the same magnetic poles of adjacent magnets face each other in a circumferential direction of the rotor core, the rotor core includes two magnetic paths formed between the first magnetic flux blocking part and the two second magnetic flux blocking parts adjacent to first magnetic flux blocking part. The two magnetic paths branch in different directions toward the annular part from the end of the magnetic pole piece toward the rotating shaft.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 3 is an exploded perspective view of the brushless motor according to the first embodiment;

DETAILED DESCRIPTION OF THE INVENTION

Figure 1:
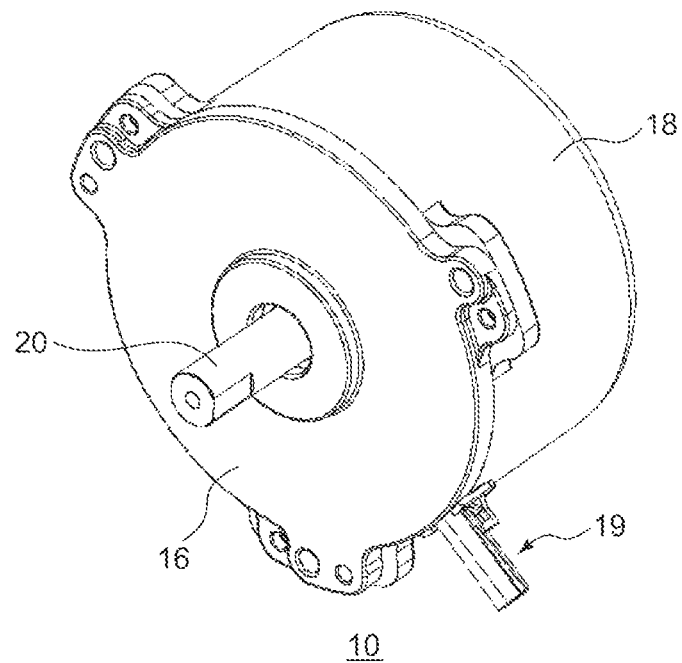
FIG. 1 is an overall perspective view of a brushless motor according to the first embodiment.

The invention will now be described by reference to the preferred embodiments. This does not intend to limit the scope of the present invention, but to exemplify the invention.

A rotor according to an embodiment of the present invention includes: a rotor core; and a plurality of magnets. The rotor core includes: an annular part around a hole in which a rotating shaft is inserted; a plurality of magnetic pole pieces radially formed around the annular part; and a plurality of magnet holders radially formed between adjacent magnetic pole pieces, a plurality of first magnetic flux blocking parts formed outside the annular part and in respective areas between adjacent magnet holders. The magnet holder includes a second magnetic flux blocking part at an end of the magnetic holder toward the rotating shaft. The magnets are housed in the magnet holders such that the same magnetic poles of adjacent magnets face each other in a circumferential direction of the rotor core, and the rotor core includes two magnetic paths formed between the first magnetic flux blocking part and the two second magnetic flux blocking parts adjacent to the first magnetic flux blocking part. The two magnetic paths branch in different directions toward the annular part from the end of the magnetic pole piece toward the rotating shaft.

The first magnetic flux blocking part and the second magnetic flux blocking part restrain a short circuit, within the rotor core, of the magnetic flux emanating from the magnet. Thus, the rotor according to the embodiment is suitable for a high-torque brushless motor. Since each magnetic pole piece is supported by the two magnetic paths, the mechanical strength with which the magnetic pole piece is fixed to the annular part is improved and the displacement of the magnetic pole piece during the rotation of the rotor is reduced. Since the two magnetic paths branch toward the annular part in different directions from the end of the magnetic pole piece toward the rotating shaft, the displacement of the magnetic pole piece in the presence of various external forces that differ in the direction of exertion against the magnetic pole piece is effectively reduced.

The two magnetic paths may be provided in linear symmetry with respect to a central line of the magnetic pole piece. This ensures that the force that supports the magnetic pole piece remains unchanged regardless of whether the rotor is rotated clockwise or counterclockwise.

The first magnetic flux blocking part and the second magnetic flux blocking part may be configured such that: an angle α formed by a straight line L1 through a center of the magnetic path and a central line L2 of the magnetic pole piece is larger than 0°, and an angle β formed by the straight line L1 through the center of the magnetic path and a plane P1 including an end face of the magnet toward the rotating shaft is larger than 10°. In this way, the first magnetic flux blocking part and the second magnetic flux blocking part are formed to have a proper size.

The second magnetic flux blocking part may be a through hole extending in a direction of the rotating shaft and provided with a function of positioning the magnet in a radial direction. A circumferential width of an area of the second magnetic flux blocking part adjacent to the magnet is smaller than a circumferential width of the magnet housed in the magnet holder. In this way, the short circuit flux is reduced by using a simple structure. Thus, it is not necessary to configure the second magnetic flux blocking part to have a special form for the purpose of positioning the magnet in the radial direction.

The first magnetic flux blocking part may be a through hole extending in a direction of the rotating shaft. In this way, the short circuit flux is reduced by using a simple structure.

An outer circumference of the magnetic pole piece may be isolated from an adjacent magnetic pole piece. This reduces the short circuit flux in the vicinity of the outer circumferential end face of the magnet.

Given that a radius of curvature of an outer circumferential surface of the magnetic pole piece is R and the maximum outer diameter of the rotor core is L, R<L/3 is met. This provides a brushless motor characterized by reduced torque variation and smooth rotation.

The motor may include a tubular stator provided with a plurality of windings; the aforementioned rotor provided at a center of the stator; and a power feeder for feeding power to the plurality of windings of the stator. This increases the average magnetic flux density at the rotor outer circumference and contributes to improvement in the motor torque.

Optional combinations of the aforementioned constituting elements, and implementations of the invention in the form of methods, apparatuses, and systems may also be practiced as additional modes of the present invention. According to the embodiments described above, a high-rigidity and low-noise brushless motor is realized.

A description will be given of the embodiments of the present invention with reference to the drawings. Like numerals represent like elements so that the description will be omitted accordingly. The structures described hereinbelow are only exemplary and does not limit the scope of the present invention. A brushless motor of inner rotor type is described below by way of an example.

First Embodiment (Brushless Motor)

Figure 2:
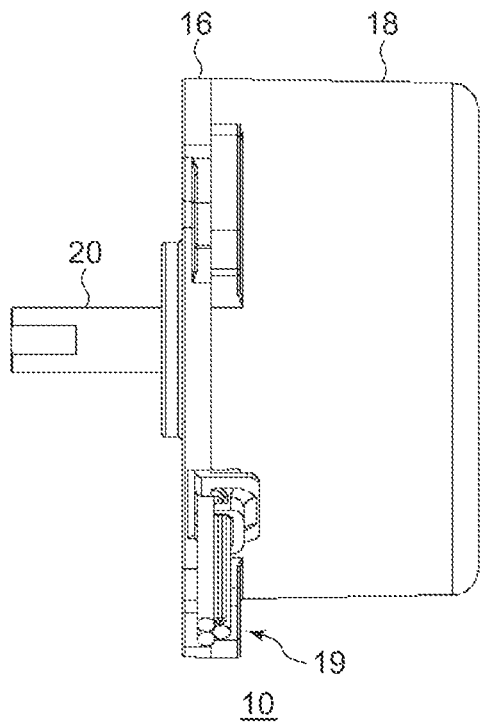
FIG. 2 is a lateral view of the brushless motor according to the first embodiment.

FIG. 1 is an overall perspective view of a brushless motor according to the first embodiment. FIG. 2 is a lateral view of the brushless motor according to the first embodiment. FIG. 3 is an exploded perspective view of the brushless motor according to the first embodiment.

The brushless motor (hereinafter, sometimes referred to as "motor") 10 according to the first embodiment includes a columnar rotor 12 including a magnet, a stator 14 including at its center a space for placing the rotor 12, a front bell 16, a housing body 18, and a power feeder 19.

The front bell 16, which is a plate-shaped member, is formed with a hole 16a at the center so that a rotating shaft 20 can penetrate therethrough, and is formed with a recess 16b near the hole 16a to hold a bearing 22. The front bell 16 supports a portion of the rotating shaft 20 of the rotor 12 via the bearing 22. The housing body 18 is a cylindrical member. A recess 18b for supporting a bearing (not shown) is formed at the center of a base 18a. The housing body 18 supports another portion of the rotating shaft 20 of the rotor 12 via the bearing. In the first embodiment, the front bell 16 and the housing body 18 constitute a housing member for housing the rotor 12 and the stator 14.

(Rotor)

Figure 4A:
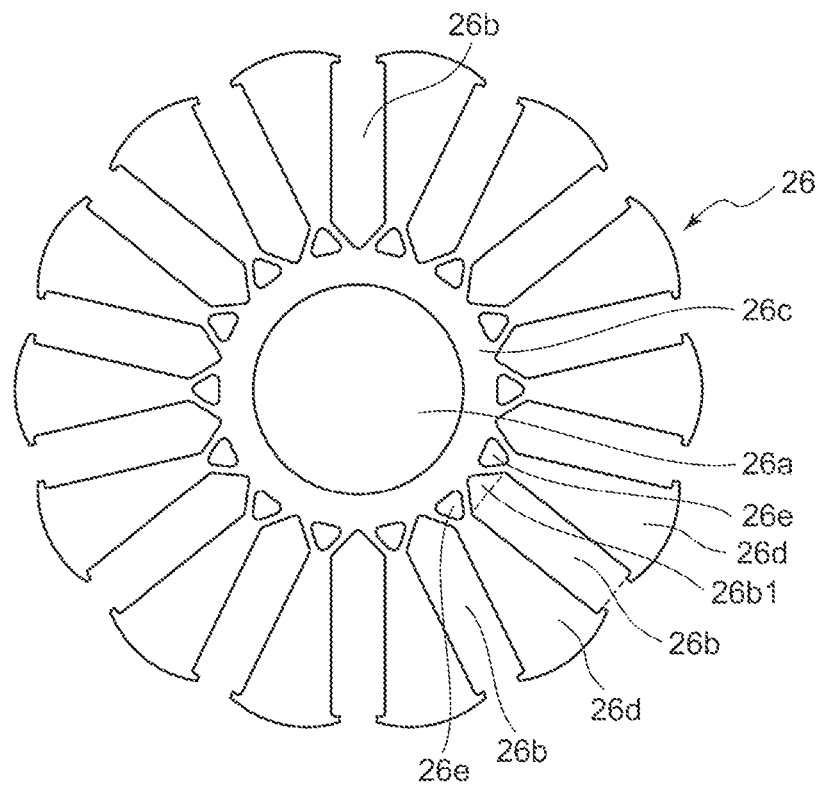
FIG. 4A is a top view of the rotor core according to the embodiment.
Figure 4B:
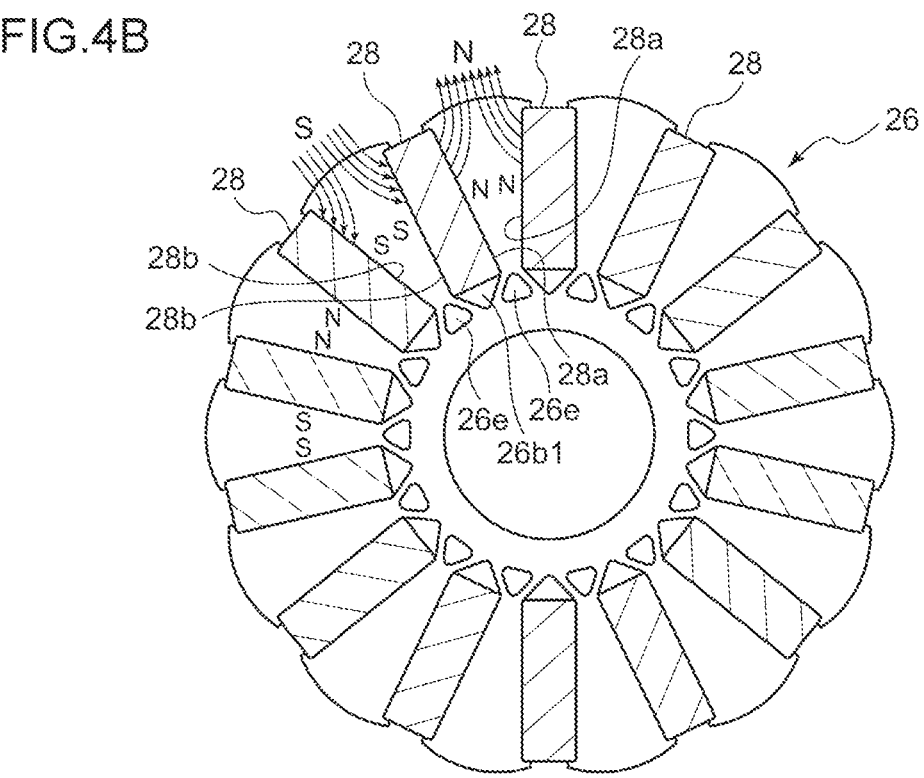
FIG. 4B is a top view showing how the magnet is fitted into the rotor core shown in FIG. 4A.

FIG. 4A is a top view of the rotor core according to the first embodiment, and FIG. 4B is a top view showing how the magnet is fitted into the rotor core shown in FIG. 4A.

The rotor 12 includes a circular rotor core 26 and a plurality of magnets 28. A through hole 26a, in which the rotating shaft 20 is inserted and fixed, is formed in the center of the rotor core 26. The rotor core 26 further includes an annular part 26c around the through hole 26a in which the rotating shaft 20 is inserted, a plurality of fan-shaped magnetic pole pieces 26d radially formed around the annular part 26c, a plurality of magnet holders 26b radially formed between two adjacent magnetic pole pieces 26d, and a plurality of first magnetic flux blocking parts 26e formed outside the annular part 26c.

The magnet 28 is inserted into the magnet holder 26b and fixed therein. The magnet 28 is a members of a plate shape conforming to the shape of the magnet holder 26b.

The members described above are assembled in sequence. More specifically, a plurality (i.e., fourteen) of magnets 28 are fitted into the corresponding magnet holders 26b, and the rotating shaft 20 is inserted into the through hole 26a of the rotor core 26. The bearing 22 is then mounted to the rotating shaft 20.

(Rotor Core)

The rotor core 26 shown in FIG. 4A is built by laminating a plurality of plate-shaped members. Each of the plurality of plate-shaped members is manufactured such that a non-oriented electromagnetic steel sheet (e.g., silicon steel sheet) is stamped out into a predetermined shape, as shown in FIG. 4A, by press-forming. The magnet holders 26b are radially formed around the rotating shaft of the rotor core 26. The rotor core 26 may be manufactured by powder compacting.

As shown in FIG. 4B, the magnets 28 are housed in the magnet holders 26b such that the same magnetic poles of adjacent magnets face each other in the circumferential direction of the rotor core 26. In other words, the magnets 28 are configured such that principal surfaces 28a and 28b, whose surface areas are largest among the six surfaces of each of the adjacent magnets 28 that are approximately rectangular parallelepipeds, are an N-pole and an S-pole, respectively. Thus, the lines of magnetic force emanating from the principal surface 28a of the magnet 28 are directed outward of the rotor core 26 from an area between the two adjacent magnets 28. As a result, the rotor 12 according to the first embodiment functions as fourteen magnets such that seven N-poles and seven S-poles are alternately formed on the outer circumferential of the rotor 12. The magnets may be arranged in a V-shape instead of in the I-shape as shown in FIG. 4B.

The magnet 28 is a bonded magnet, a sintered magnet or the like, for instance. The bonded magnet is a magnet formed such that a magnetic material is kneaded with a rubber or resin material and then the resulting material undergoes injection molding or compression molding. Where the bonded magnet is used, a high-precision C face (inclined plane) or R face is obtained without having to undergo any postprocessing. On the other hand, the sintered magnet is a magnet formed such that powered magnetic materials are sintered at high temperature. The sintered magnet is more likely to improve the residual magnetic flux density than the bonded magnet is. However, in order to have a high-precision C face or R face, the postprocessing is often required.

The magnet holder 26b according to the first embodiment is provided with a second magnetic flux blocking part 26b1 at the end of the magnet holder 26b toward the rotating shaft 20 (through hole 26a). The aforementioned first magnetic flux blocking part 26e is formed between the second magnetic flux blocking parts 26b1 adjacent to the first magnetic flux blocking part 26e. The first magnetic flux blocking part 26e and the second magnetic flux blocking part 26b1 are configured to restrain a short circuit, within the rotor core 26, of the magnetic flux (lines of magnetic force) emanating from the plate-shaped magnet 28. In other words, the lines of magnetic force emanating from the principal surface 28a of the magnet 28 are prevented from being short-circuited within the rotor core 26 by the first magnetic flux blocking part 26e and the second magnetic flux blocking part 26b1. The area in which the lines of magnetic force pass through is called a magnetic path. The longer the magnetic path, the higher the magnetic resistance and the harder it becomes for the lines of magnetic force to pass through.

(Magnetic Path)

Figure 5:
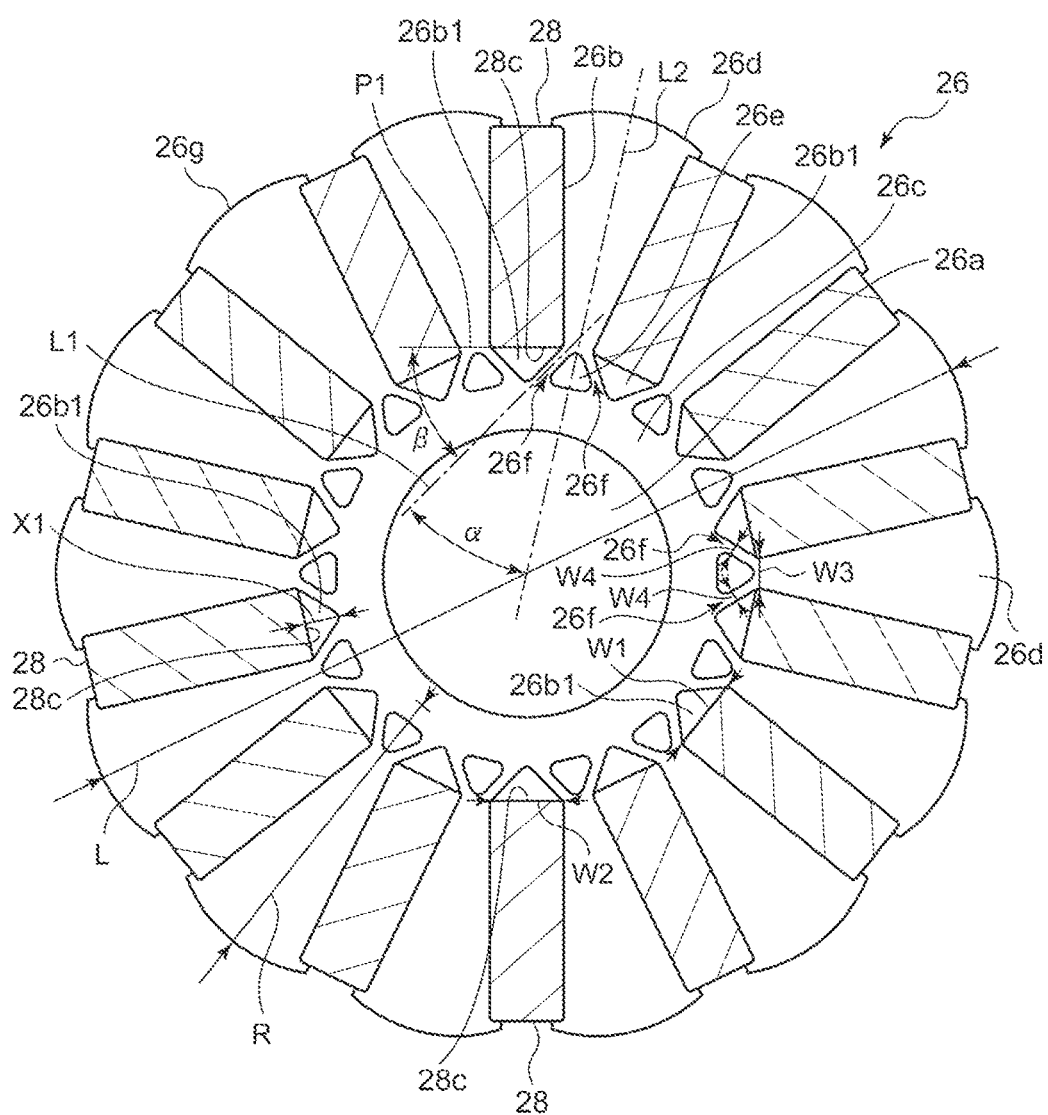
FIG. 5 is a top view of the rotor core showing the magnetic path according to the first embodiment.

FIG. 5 is a top view of the rotor core showing the magnetic path according to the first embodiment. The rotor core 26 according to the first embodiment includes two magnetic paths 26f formed between the the first magnetic flux blocking part 26e and the two second magnetic flux blocking parts 26b1 adjacent to the first magnetic flux blocking part 26e. The two magnetic paths 26f branch toward the annular part 26c in different directions (i.e., in a Y shape) from the end of the magnetic pole piece 26d toward the through hole 26a.

The first magnetic flux blocking part 26e and the second magnetic flux blocking part 26b1 restrain a short circuit, within the rotor core, of the magnetic flux emanating from the magnet 28. Thus, the rotor according to the embodiment is suitable for a high-torque brushless motor. Since each magnetic pole piece 26d is supported by the two magnetic paths 26f with respect to the annular part 26c, the mechanical strength with which the magnetic pole piece 26d is fixed to the annular part 26c is improved and the displacement of the magnetic pole piece 26d during the rotation of the rotor is reduced. Since the two magnetic paths 26f branch toward the annular part 26c in different directions from the end of the magnetic pole piece 26d toward the through hole 26a, the displacement of the magnetic pole piece 26d in the presence of various external forces (magnetic force and centrifugal force) that differ in the direction of exertion against the magnetic pole piece 26d is effectively reduced.

As shown in FIG. 5, the two magnetic paths 26f according to the first embodiment are formed such that the longitudinal directions thereof are different. The two magnetic paths 26f are provided in linear symmetry with respect to the diameter of the rotor core 26. This ensures that the force that supports the magnetic pole piece 26d remains unchanged regardless of whether the rotor 12 is rotated clockwise or counterclockwise.

The first magnetic flux blocking part 26e and the second magnetic flux blocking part 26b1 are configured such that the angle α formed by the straight line L1 through the center of the magnetic path and the central line L2 of the magnetic pole piece 26d is larger than 0°, and the angle β formed by the straight line L1 through the center of the magnetic path and the plane P1 including the end face 28c of the magnet 28 toward the rotating shaft (through hole 26a) is larger than 10°. By setting the angle α to be larger than 0° and the angle β to be larger than 10°, the first magnetic flux blocking part 26e and the second magnetic flux blocking part 26b1 are formed to have a size capable of reducing the short circuit flux. In the rotor core 26 according to the embodiment, the angle α is about 30° and the angle β is about 47°.

The angle α is preferably 15° or larger and, more preferably, 30° or larger. Further, the angle β is preferably 20° or larger and, more preferably, 30° or larger. In this way, the first magnetic flux blocking part 26e and the second magnetic flux blocking part 26b1 are formed to have a size capable of reducing the short circuit flux substantially.

The first magnetic flux blocking part 26e and the second magnetic flux blocking part 26b1 are triangular through holes extending in the direction of the rotating shaft (direction perpendicular to the surface of the paper). In this way, the short circuit flux is reduced by using a simple structure that is easy to manufacture. The first magnetic flux blocking part 26e may be an equilateral triangle in shape. The first magnetic flux blocking part 26e and the second magnetic flux blocking part 26b1 according to the first embodiment are hollow areas filled with air, which has a small magnetic permeability. Alternatively, a substance with a small magnetic permeability may fill the areas. In this case, the strength of the rotor core 26 as a whole is improved.

The second magnetic flux blocking part 26b1 has the function of positioning the magnet 28 in the radial direction. More specifically, the circumferential width W1 of the area of the second magnetic flux blocking part 26b1 adjacent to the plate-shaped magnet is smaller than the circumferential width W2 of the magnet 28 housed in the magnet holder 26b. Thus, it is not necessary to configure the second magnetic flux blocking part 26b1 to have a special form for the purpose of positioning the magnet 28 in the radial direction. This improves the precision of dimension of the parts produced by stamping out the plate-shaped members of the rotor core 26 by press-forming.

An outer circumference 26g of the magnetic pole piece 26d according to the first embodiment is isolated from the adjacent magnetic pole piece 26d. This reduces the short circuit flux in the vicinity of the outer circumferential end face of the magnet 28.

Given that the radius of curvature of the outer circumference 26g of the fan-shaped magnetic pole piece 26d is R and the maximum outer diameter of the rotor core is L, R<L/3 is met. This realizes a brushless motor characterized by reduced torque variation and smooth rotation.

The motor 10 according to the first embodiment includes the tubular stator 14 provided with a plurality of windings, the aforementioned rotor 12 provided at the center of the stator 14, and the power feeder 19 for feeding power to the plurality of windings of the stator 14. In this way, the average magnetic flux density at the outer circumference of the rotor is increased and the mechanical strength of the rotor is maintained at the same. As a result, a high-torque, high-rigidity, and low-noise brushless motor is realized.

The distance X1 in the second magnetic flux blocking part 26b1 between the end face 28c of the magnet 28 and the annular part 26c of the rotor core 26 is preferably 0.5 mm or greater.

Given that the width of the narrowest part at the root of the magnetic pole piece 26d is W3 and the width of the magnetic path 26f is W4, the first magnetic flux blocking part 26e and the second magnetic flux blocking part 26b1 may be configured to meet W3>2×W4. This further makes it difficult for lines of magnetic force emanating from the principal surface of the magnet 28 to pass through the magnetic path and reduces the short circuit flux more successfully.

Second Embodiment

Figure 6:
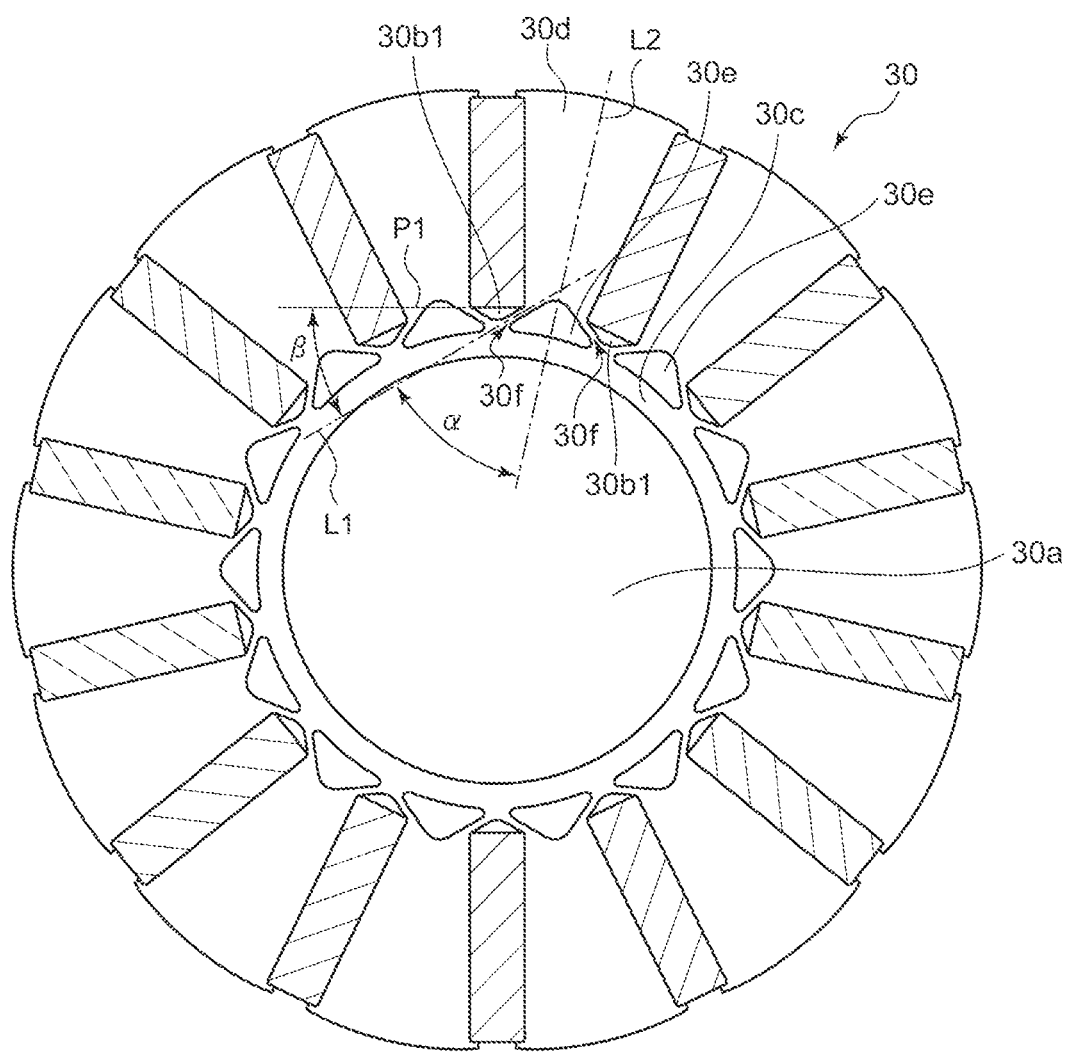
FIG. 6 is a top view of the rotor core showing the magnetic path according to the second embodiment.

FIG. 6 is a top view of the rotor core showing the magnetic path according to the second embodiment. Those components that are the same as the components of the rotor core 26 according to the first embodiment are denoted by the same numerals and a description thereof is omitted as necessary.

A rotor core 30 according to the second embodiment includes two magnetic paths 30f formed between the a first magnetic flux blocking part 30e and two second magnetic flux blocking parts 30b1 adjacent to the first magnetic flux blocking part 30e. The two magnetic paths 30f branch toward an annular part 30c in different directions from the end of a magnetic pole piece 30d toward a through hole 30a.

The main difference of the rotor core 30 according to the second embodiment from the rotor core 26 according to the first embodiment is in the size and shape of the first magnetic flux blocking part 30e and the second magnetic flux blocking part 30b1. In the rotor core 30 according to the second embodiment, the angle α is about 47° and the angle β is about 30°.

Third Embodiment

Figure 7A:
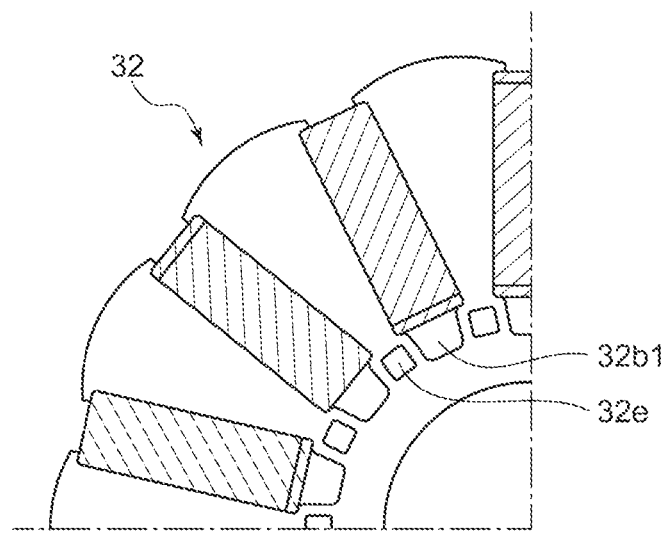
FIGS. 7A and 7B are top views of the rotor core according to the third embodiment.
Figure 7B:
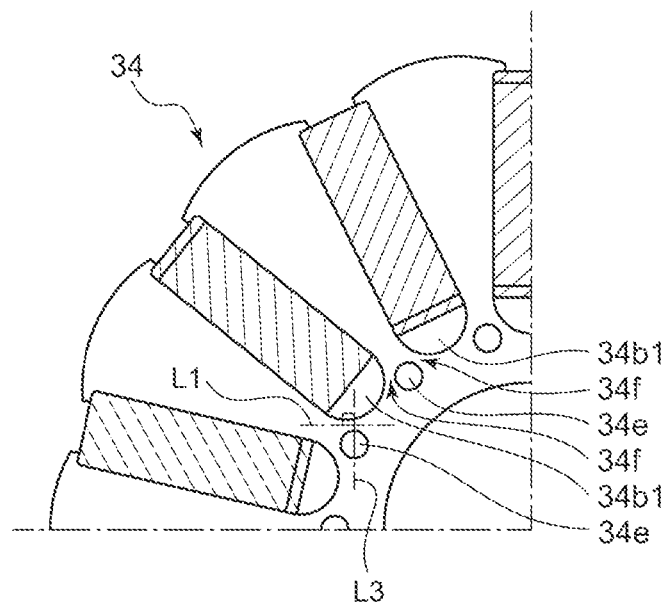

FIGS. 7A and 7B are top views of the rotor core according to the third embodiment. In a rotor core 32 shown in FIG. 7A, a first magnetic flux blocking part 32e and a second magnetic flux blocking part 30b1 have the shape of a square (isosceles trapezoid). In a rotor core 34 shown in FIG. 7B, a first magnetic flux blocking part 34e has the shape of a circle and a second magnetic flux blocking part 34b1 has the shape of a semicircle. Where the width of a magnetic path 34f is not uniform as in the case of the rotor core 34, the straight line L1 through the center of the magnetic path 34f could be defined as a straight line perpendicular to a straight line L3 through a position where the first magnetic flux blocking part 34e and the second magnetic flux blocking part 34b1 are closest to each other.

Fourth Embodiment

Figure 8:
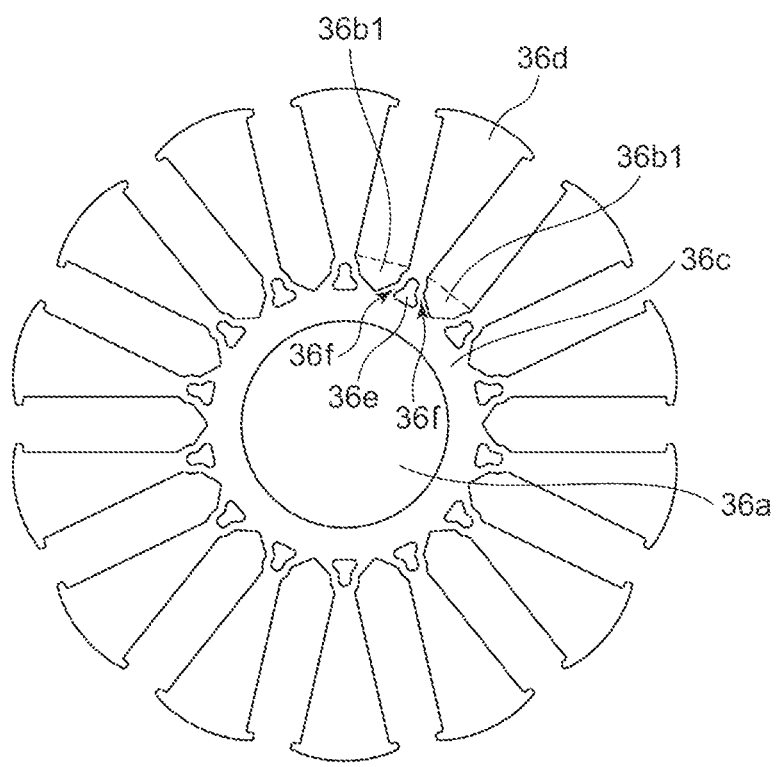
FIG. 8 is a top view of the rotor core showing the magnetic path according to the fourth embodiment.
Figure 9:
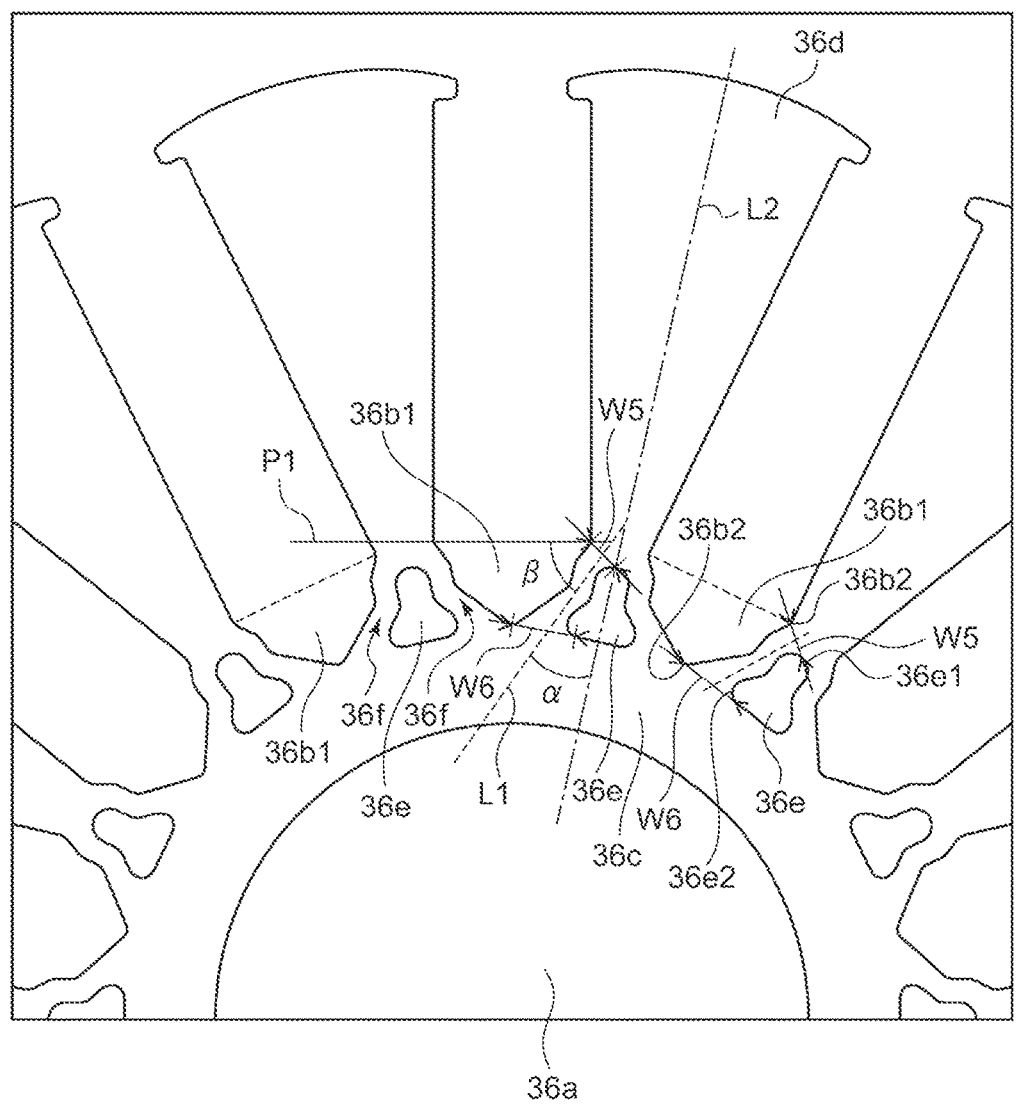
FIG. 9 is an enlarged view of an important part of the magnetic path according to the fourth embodiment.

FIG. 8 is a top view of the rotor core showing the magnetic path according to the fourth embodiment. FIG. 9 is an enlarged view of an important part of the magnetic path according to the fourth embodiment. Those components that are the same as the components of the rotor core 26 according to the first embodiment are denoted by the same numerals and a description thereof is omitted as necessary.

A rotor core 36 according to the fourth embodiment includes two magnetic paths 36f formed between the a first magnetic flux blocking part 36e and two second magnetic flux blocking parts 36b1 adjacent to the first magnetic flux blocking part 36e. The two magnetic paths 36f branch toward an annular part 36c in different directions from the end of a magnetic pole piece 36d toward a through hole 36a. The rotor core 36 according to the fourth embodiment is unique in that the magnetic path 36f is bent in the middle.

In this case, the straight line L1 through the center of the magnetic path 36f may be defined as follows. For example, the straight line L1 could be defined as a line connecting a) the middle of a width W5 between a radial end 36e1 of the first magnetic flux blocking part 36e and a circumferential end 36b2 of the second magnetic flux blocking part 36b1 toward the magnet and b) the middle of a width W6 between a circumferential end 36e2 of the first magnetic flux blocking part 36e and a radial end 36b2 of the second magnetic flux blocking part 36b1.

Fifth Embodiment

Figure 10A:
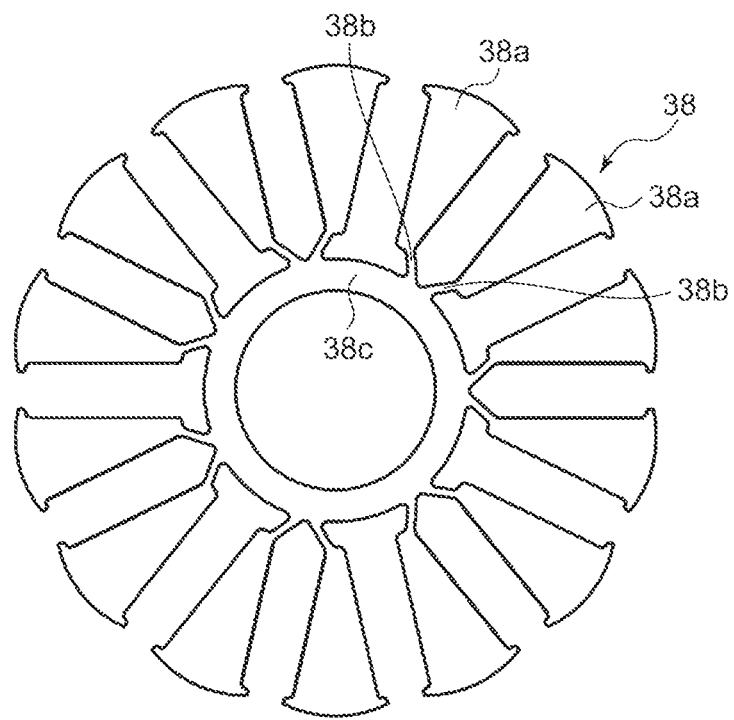
FIG. 10A is a top view of a single plate-shaped member forming the rotor core according to the fifth embodiment.
Figure 10B:
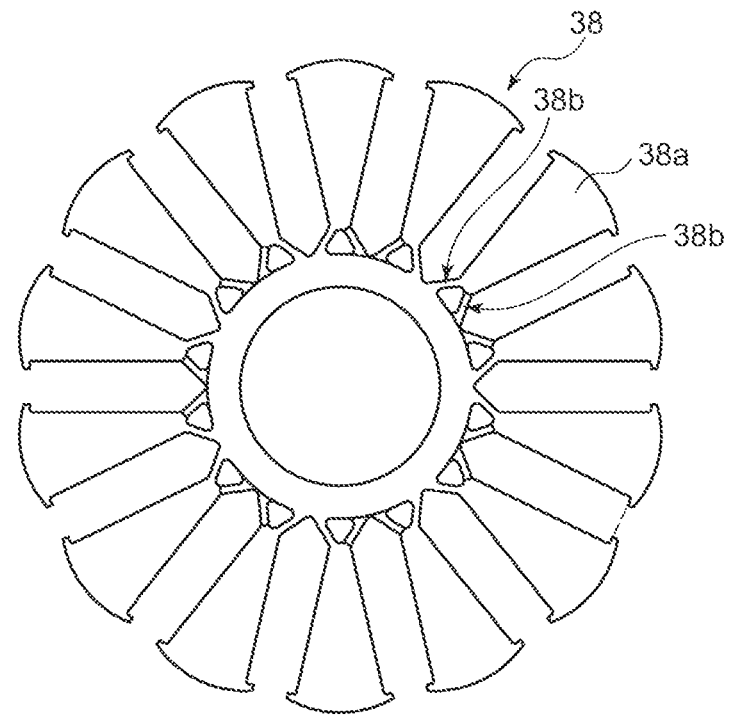
FIG. 10B is a top view of the rotor core according to the fifth embodiment.
Figure 11:
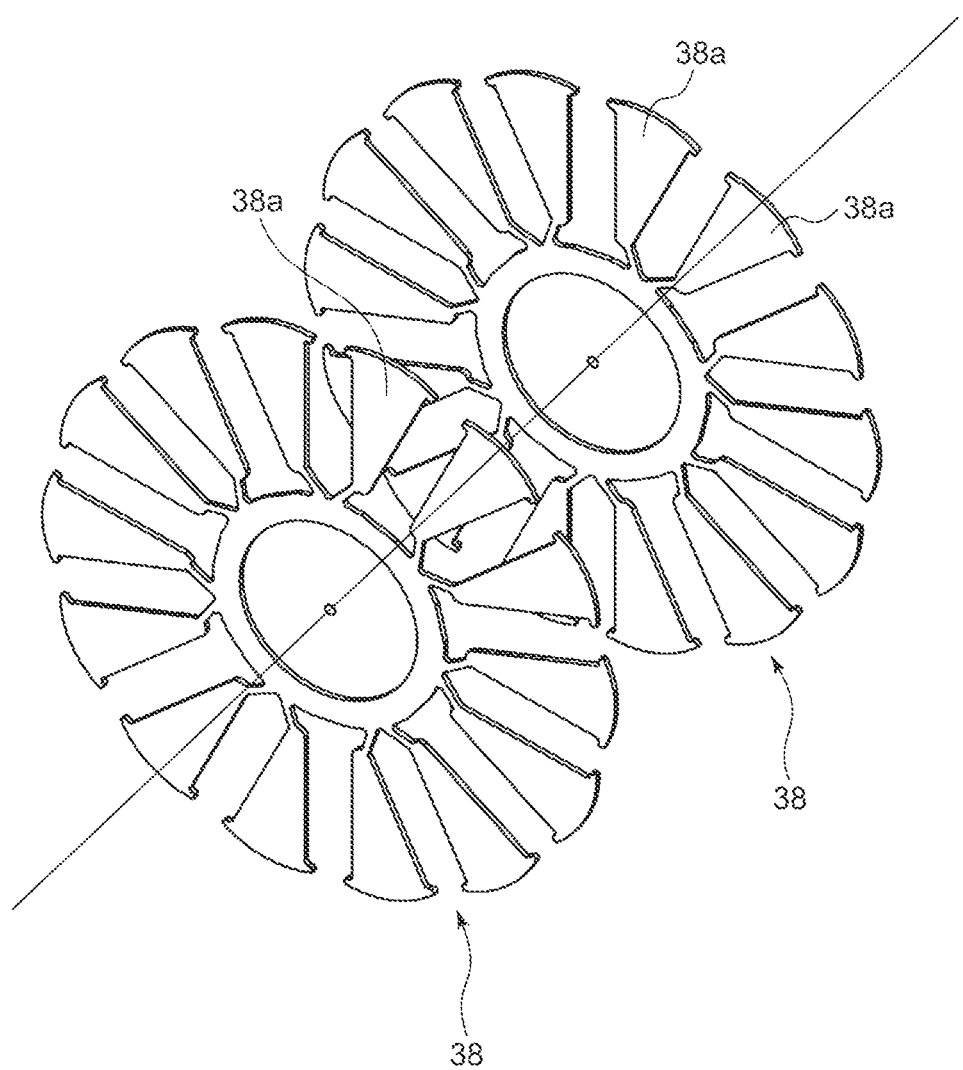
FIG. 11 shows the relative positions of two plate-shaped members laminated on each other.
Figure 12:
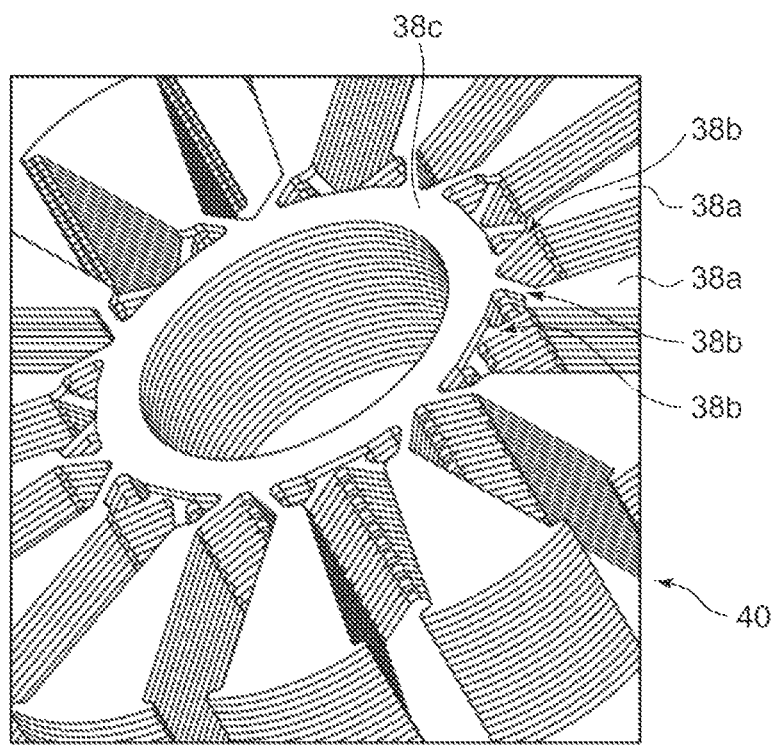
FIG. 12 is a perspective view of the rotor core according to the fifth embodiment.

FIG. 10A is a top view of a single plate-shaped member forming the rotor core according to the fifth embodiment, and FIG. 10B is a top view of the rotor core according to the fifth embodiment. FIG. 11 shows the relative positions of two plate-shaped members laminated on each other. FIG. 12 is a perspective view of the rotor core according to the fifth embodiment.

As shown in FIG. 10A, a plate-shaped member 38 in isolation does not form two types of magnetic flux blocking parts or form two magnetic paths for each magnetic pole piece. More specifically, a magnetic pole piece 38a is supported by a single magnetic path 38b. As shown in FIG. 11, a rotor core 40 is formed by repeatedly laminating a plate-shaped member 38 upon another plate-shaped member 38, displacing the plate-shaped members 38 from each other by a rotational angle for one magnetic pole piece ((360/14)° in the case of the fifth embodiment), and by mechanically fixing the magnetic pole pieces of the respective plate-shaped members using a method such as boss caulking.

As shown in FIG. 10B, this gives an appearance that a single magnetic pole piece 38a is supported two magnetic paths 38b. In the rotor core 40 according to the fifth embodiment, the magnetic resistance of the magnetic path 38b is substantially increased, and the mechanical strength of the magnetic pole piece 38a as laminated with respect to an annular part 38c is also maintained. Further, leakage of magnetic flux into the rotor is significantly reduced.

[Suitable Range of Angle α and Angle β]

Figure 13:
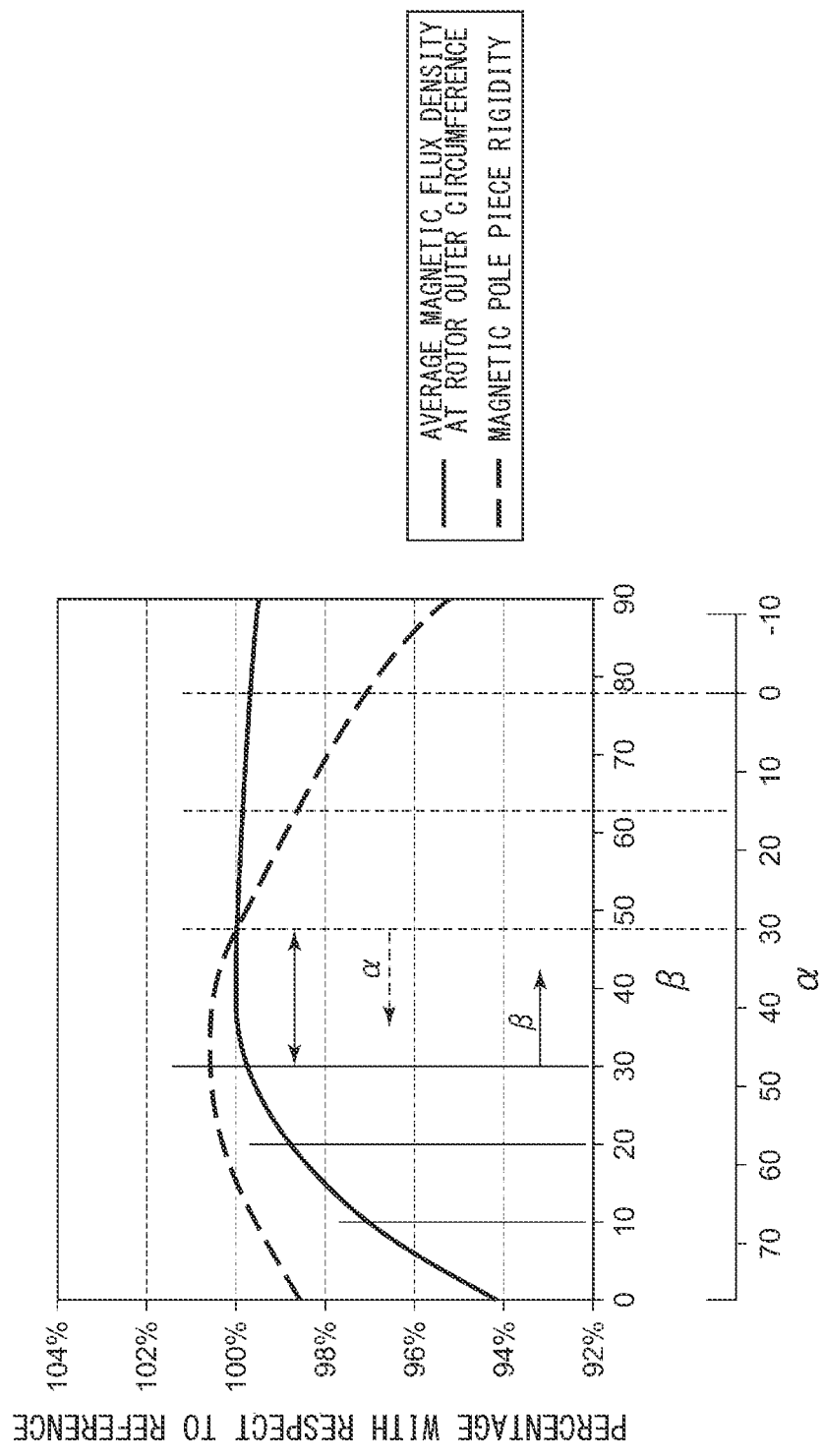
FIG. 13 is a graph showing a suitable range of the angle $\alpha$ and the angle $\beta$ in the rotor.

FIG. 13 is a graph showing a suitable range of the angle α and the angle β in the rotor.

FIG. 13 shows variation in the values of the average magnetic flux density of the rotor and of the magnetic pole piece rigidity plotted on the vertical axis, where the values targeted in the design (reference) is defined as 100%. For example, the angle α is 30° and the angle β is 47° in the rotor according to the first embodiment. In the rotor according to the second embodiment, the angle α is 47° and the angle β is 30°.

When the angle α is larger than 0°, the percentage of the rigidity of the magnetic pole piece is about 97% or higher with respect to the reference so that sufficient rigidity of the magnetic pole piece is ensured. When the angle is larger than 10°, the percentage of the average magnetic flux density at the outer circumference of the rotor is about 97% or higher with respect to the reference so that the sufficient motor performance exhibited.

Further, when the angle α is 15° or larger and the angle β is 20° or larger, the percentage of the rigidity of the magnetic pole piece and the average magnetic flux density at the outer circumference of the rotor is about 98.5% or higher with respect to the reference so that the requirements for both the rigidity of the magnetic pole piece and the motor performance can be met at a higher level.

When the angle α is 30° or larger and the angle β is 30° or larger, the percentage of the rigidity of the magnetic pole piece is 100% or higher with respect to the reference and the average magnetic flux density at the outer circumference of the rotor is approximately 100% with respect to the reference so that it is possible to provide a more suitable motor with uncompromising quality in terms of the magnetic pole rigidity and motor performance.

As the angle α is increased, the percentage of the average magnetic flux density at the outer circumference of the rotor begins to drop below 100% beyond 47°. As the angle β is increased, the rigidity of the magnetic pole pieces also begins to drop below 100% beyond 47°. Based on the foregoing, it is preferable that the rotor according to the embodiments be configured such that the angle α is 30°-47° and the angle β is 30°-47°.

A description will now be given of the specification of the brushless motor in which the embodiments can be suitably used. The outer diameter of the brushless motor according to the embodiments is about 30-140 mm and, preferably, about 35-85 mm. The number of grooves (teeth) of the stator is, for example, 12. It is preferable that the number of magnets be 10 or 14. The magnetic force (energy product) of the magnet is 8 MGOe or higher, and, preferably, 10 MGOe or higher, and, more preferably, 30 MGOe or higher. Further, the diameter of the rotor is preferably 20-70 mm. The width of the magnetic path described above is larger than the thickness of a single plate-shaped member forming the rotor core (about 0.35-0.5 mm).

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

What is claimed is:

1. A rotor comprising:
a rotor core; and
a plurality of magnets, wherein
the rotor core includes:
an annular part around a hole in which a rotating shaft is inserted;
a plurality of magnetic pole pieces radially formed around the annular part; and
a plurality of magnet holders radially formed between adjacent magnetic pole pieces,
a plurality of first magnetic flux blocking parts formed only outside the annular part and in respective areas between adjacent magnet holders, wherein
the magnet holder includes a second magnetic flux blocking part at an end of the magnetic holder toward the rotating shaft,
the magnets are housed in the magnet holders such that the same magnetic poles of adjacent magnets face each other in a circumferential direction of the rotor core,
the first magnetic flux blocking parts are formed only between the adjacent second magnetic flux blocking parts,
the second magnetic flux blocking parts are through holes extending in a direction of the rotating shaft,
the rotor core includes two magnetic paths formed between the first magnetic flux blocking part and the two second magnetic flux blocking parts adjacent to the first magnetic flux blocking part,
the two magnetic paths branch in different directions toward the annular part from the end of the magnetic pole piece toward the rotating shaft,
the first magnetic flux blocking parts and the second magnetic flux blocking parts are configured such that:
an angle α formed by a straight line L1 through a center of the magnetic path and a central line L2 of the magnetic pole piece is between 30° and 47°,
an angle β formed by the straight line L1 through the center of the magnetic path and a plane P1 including an end face of the magnet toward the rotating shaft is between 30° and 47°,
given that a radius of curvature of an outer circumferential surface of the magnetic pole piece is R and the maximum outer diameter of the rotor core is L, R<L/3 is met,
the width W3 of the narrowest part of the magnetic pole piece and the width W4 of the magnetic path are configured to meet W3>2×W4,
a portion of each second magnetic flux blocking part that is adjacent to its magnetic holder is circumferentially in line with the narrowest part of each adjacent magnetic pole piece,
the rotor core is built by laminating a plurality of electromagnetic steel sheets, and
a width of the magnetic path is larger than the thickness of a single electromagnetic steel sheet forming the rotor core.

2. The rotor according to claim 1, wherein the thickness of the electromagnetic steel sheet is 0.35~0.5 mm.

3. The rotor according to claim 1, wherein an energy product of the magnet is 8 MGOe or higher.

4. The rotor according to claim 1, wherein a diameter of the rotor is 20~70 mm.

5. The rotor according to claim 1, wherein a distance between the end face of the magnet toward the rotating shaft and the annular part is 0.5 mm or greater.

6. A brushless motor comprising:
a tubular stator provided with a plurality of windings;
the rotor according to claim 1 provided at a center of the stator; and
a power feeder for feeding power to the plurality of windings of the stator, wherein
twelve teeth are provided in the stator, and
fourteen magnets are provided in the rotor.

7. The brushless motor according to claim 6, wherein an outer diameter of the brushless motor is 30~140 mm.

* * * * *